US012421677B2

(12) United States Patent
Brand et al.

(10) Patent No.: US 12,421,677 B2
(45) Date of Patent: Sep. 23, 2025

(54) CABLE BENDING LIMITING ARRANGEMENT AND COMBINATION OF A CABLE BENDING LIMITING ARRANGEMENT WITH A CABLE, AN ANCHORAGE, A COMPACTING CLAMP UNIT AND A RECESS PIPE

(71) Applicant: DYWIDAG-SYSTEMS INTERNATIONAL GMBH, Unterschleissheim (DE)

(72) Inventors: Werner Brand, Freising (DE); Marcus Schraml, Erding (DE)

(73) Assignee: DYWIDAG-SYSTEMS INTERNATIONAL GMBH, Unterschleissheim (DE)

( * ) Notice: Subject to any disclaimer, the term of this patent is extended or adjusted under 35 U.S.C. 154(b) by 560 days.

(21) Appl. No.: 17/796,309

(22) PCT Filed: Mar. 9, 2020

(86) PCT No.: PCT/EP2020/056158
§ 371 (c)(1),
(2) Date: Jul. 29, 2022

(87) PCT Pub. No.: WO2021/180298
PCT Pub. Date: Sep. 16, 2021

(65) Prior Publication Data
US 2023/0142377 A1    May 11, 2023

(51) Int. Cl.
*E01D 19/16* (2006.01)
*E01D 19/14* (2006.01)
*F16G 11/04* (2006.01)

(52) U.S. Cl.
CPC ............. *E01D 19/16* (2013.01); *E01D 19/14* (2013.01); *F16G 11/04* (2013.01)

(58) Field of Classification Search
CPC .......... E01D 19/14; E01D 19/16; F16G 11/04
(Continued)

(56) References Cited

U.S. PATENT DOCUMENTS 1,797,759 A * 3/1931 De Forest ............... E01D 19/14
403/275
4,068,963 A 1/1978 Brandestini
(Continued)

FOREIGN PATENT DOCUMENTS

EP    1 357 229    10/2003
GB    2 514 621    12/2014
(Continued)

OTHER PUBLICATIONS

International Search Report filed in PCT/EP2020/056158 dated Nov. 25, 2020.

*Primary Examiner* — Raymond W Addie
(74) *Attorney, Agent, or Firm* — RANKIN, HILL & CLARK LLP

(57) ABSTRACT

A cable bending limiting arrangement is provided for an anchoring unit including an anchorage, a cable including a plurality of wires and/or strands extending in a tensioned manner from the anchorage, a compacting clamp unit adapted for compacting the wires and/or strands to a side-by-side arrangement and located at a predetermined distance from the anchorage, and a recess pipe surrounding the cable in at least a portion of the predetermined distance. The cable bending limiting arrangement includes a cable bending limiting device adapted for being located axially inside the recess pipe and radially between an outer surface of the cable and an inner surface of the recess pipe leaving an annular gap of a predetermined radial width if the longitudinal axis of the cable extends substantially parallel to the longitudinal axis of the anchorage.

11 Claims, 3 Drawing Sheets

Figure 1:
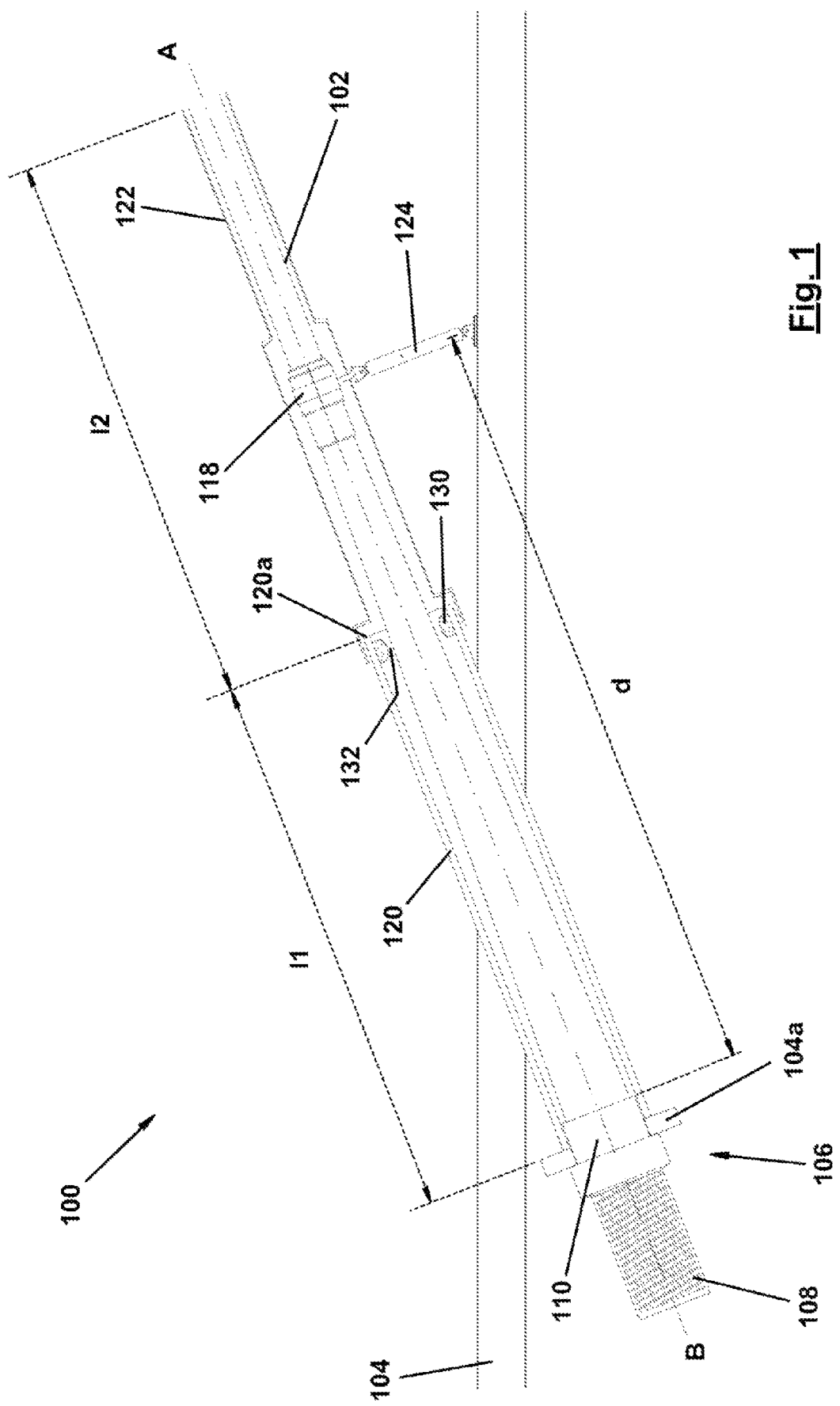

(58) Field of Classification Search
USPC .................................................... 14/22, 21
See application file for complete search history.

(56) References Cited

U.S. PATENT DOCUMENTS

| | | | | |
|---|---|---|---|---|
| 4,473,915 A | * | 10/1984 | Finsterwalder | E01D 19/14 |
| | | | | 14/18 |
| 4,633,540 A | * | 1/1987 | Jungwirth | E04C 5/122 |
| | | | | 52/223.13 |
| 5,173,982 A | * | 12/1992 | Lovett | E01D 19/14 |
| | | | | 57/217 |
| 9,850,630 B2 | * | 12/2017 | Annan | E01D 19/16 |
| 2003/0093869 A1 | * | 5/2003 | Petersen | E01D 19/16 |
| | | | | 14/22 |
| 2004/0237222 A1 | * | 12/2004 | Stubler | E01D 19/14 |
| | | | | 14/22 |
| 2005/0262648 A1 | * | 12/2005 | Nuetzel | E01D 19/14 |
| | | | | 14/22 |
| 2014/0352084 A1 | * | 12/2014 | Mathey | E01D 19/16 |
| | | | | 14/22 |
| 2015/0026901 A1 | * | 1/2015 | Brand | E01D 11/04 |
| | | | | 14/22 |
| 2015/0113744 A1 | * | 4/2015 | Stubler | E01D 11/04 |
| | | | | 248/636 |

FOREIGN PATENT DOCUMENTS

| | | |
|---|---|---|
| JP | H07 3720 | 1/1995 |
| JP | H10 159016 | 6/1998 |
| JP | 2003-027416 | 1/2003 |
| JP | 2003-120752 | 4/2003 |

* cited by examiner

CABLE BENDING LIMITING ARRANGEMENT AND COMBINATION OF A CABLE BENDING LIMITING ARRANGEMENT WITH A CABLE, AN ANCHORAGE, A COMPACTING CLAMP UNIT AND A RECESS PIPE

The invention relates to a cable bending limiting arrangement for an anchoring unit comprising an anchorage, a cable including a plurality of wires and/or strands extending in a tensioned manner from the anchorage, a compacting clamp unit adapted and intended for compacting the wires and/or strands to a side-by-side arrangement and located at a predetermined distance from the anchorage, and a recess pipe surrounding the cable in at least a portion of the predetermined distance.

Such cables may, for example, be used for suspending and/or supporting structural units of super-ordinate structures, e.g. buildings, towers, bridges, and the like.

A well-known, but in no way limiting example of a cable in connection with which the cable bending limiting arrangement according to the present invention may be used is a stay cable, e.g. used for suspending the deck of a cable stayed bridge. In this case, the cable extends between a lower anchorage located close to the bridge deck and an upper anchorage located close to the top of a pylon suspending the bridge deck via the stay cables. The cable usually comprises a plurality of strands, each strand typically including seven steel wires, namely a central wire and six outer wires helically twisted around the central wire, covered in a plastic tube, e.g. made from HDPE (high density polyethylene). Conventionally, the strands of the cable widen from the compacting clamp unit towards the anchorage, as each of the strands is individually fixed to the anchorage.

In use, the cables are subject to movements, in particular lateral movements, namely dynamic movements, e.g. induced by wind and rain, vibrations of the bridge deck due to heavy traffic, earth quakes and the like, and quasi-stationary movements, e.g. induced by temperature, a traffic jam on the bridge, the exchange of a neighboring stay cable and the like. As a consequence of such lateral movements, bending stress of the strands occurs near the anchorage, which in the worst case may result in damage, e.g. wire rupture, of the strands.

In order to reduce the amplitude of dynamic lateral movements, i.e. the bending angle of the strands, and thus the bending stress acting on the cables, it has been suggested to laterally attach a damping device to the cable. Usually such damping devices are located at a distance from the anchorage which corresponds to between 2% and 3% of the overall length of the stay cable. However, it turned out that nevertheless the bending angle of the strands may exceed a critical value beyond which it becomes relevant to the design, such that the steel cross section of the wires had to be increased.

In order to avoid excessive bending angles at the anchorage, it has further been suggested to arrange so-called cable guide constructions at a certain distance from the anchorage. In this case, however, the damping devices had to be placed far away from the anchorage to be effective which in particular unnecessarily increased their size resulting i.a. in increased costs and a deteriorated appearance of the stay cables, which are often used by architects as design elements.

In view of the above, it is the object of the present invention to provide a solution to the afore-discussed problems.

According to the present invention, the cable bending limiting arrangement comprises a cable bending limiting device adapted and intended for being located axially inside the recess pipe and radially between an outer surface of the cable and an inner surface of the recess pipe leaving an annular gap of a predetermined radial width if the longitudinal axis of the cable extends substantially orthogonal to the anchorage.

Based on this design, the cable may move in the lateral direction, as long as the bending angle doesn't exceed a predetermined value defined by the predetermined radial width of the annular gap. As soon as the cable bending limiting device enters into contact with both, the cable and the recess pipe, the bending of the cable strands at the anchorage is stopped, and a second bending location is created at a distance from the anchorage resulting in a local distribution of the bending stress. Furthermore, as the recess pipe doesn't extend up to the compacting clamp unit, and as the cable bending limiting device is located inside the recess pipe, the strands of the cable are not fully compacted at the location of the cable bending limiting device and may be elastically deflected, thus further reducing the pressure exerted on the individual strands.

In this context, it should be noted that the damping effect of the damping device is decreased as soon as the stay cable enters into contact with the cable bending limiting device, as the damping effective length in this case is determined by the distance between the location of the damping device and the contact point. In practice, however, this effect occurs only in extreme situations, e.g. the exchange of a neighboring stay cable as an example of an extreme quasi-stationary situation or an earth-quake as an example of an extreme dynamic situation, or in situations of accumulated quasi-stationary and/or dynamic effects.

In view of the load-bearing capacity of the strands it is suggested that said predetermined radial width corresponds to a bending angle of not more than 40 mrad, preferably not more than 25 mrad. Based on a recess pipe having a length of 4 m, the predetermined radial width should amount to not more than 160 mm, preferably not more than 100 mm, as beyond these values, the steel cross-section of the strand wires would have to be increased.

According to a further embodiment, the cable bending limiting device may have a substantially cylindrical surface on its radially outer surface and a surface of a predetermined maximum curvature at its radially inner surface. In this embodiment, the surface of predetermined maximum curvature, i.e. predetermined minimum radius, allows to further limit the bending stress exerted on the strands. Advantageously, the radius of the predetermined curvature may amount to at least 2 m, preferably to at least 4 m, even more preferably to at least 4.3 m.

Although it is in principle also conceivable to attach the cable bending limiting device to the cable, it is suggested that the cable bending limiting device is attached to the inner surface of the recess pipe, as this alternative may easily be put into practice. In other words, the cable bending limiting device may be formed as a ring element having an outer diameter substantially equal to the inner diameter of the recess pipe.

In order to enhance the local distribution of the bending stress, it is further suggested that the cable bending limiting device is located closer to the free end of the recess pipe than to the opposite end thereof, preferably adjacent to the free end of the recess pipe.

According to a further embodiment of the invention, the cable bending limiting device may be made from polyethylene, e.g. HDPE, or a rubber material, e.g. chloroprene rubber, and/or the material of the cable bending limiting device may have an elasticity modulus of at least 700 MPa or a hardness of at least 60° Shore A, respectively, in order not to jeopardize the limitation of the bending stress due to compression of the cable bending limiting device.

In order to limit lateral movement of the cable, the cable bending limiting device may further include a damping device adapted and intended for damping lateral movement of the cable and adapted for being laterally attached to the cable.

According to an advantageous embodiment, the damping device may include a fluidic, preferably hydraulic, damper or friction damper or rubber damper.

In order to limit the size of the damping device, one end thereof may be connected to the compacting clamp unit Although the other end of the damping device may be connected to the super-ordinate structure, e.g. the bridge deck of a cable stayed bridge, it may be advantageous, if the respective other end of the damping device is connected to a transition pipe which in turn is connected to the recess pipe. As the recess pipe and thus also the transition pipe is rigidly connected to the super-ordinate structure, the damping device may be of limited size.

According to a further aspect, the invention relates to a combination of a cable bending limiting arrangement according to the afore-discussed first aspect with a cable, an anchorage, a compacting clamp unit and a recess pipe. With respect to further embodiments of this combination and the technical effects which may be used when using this combination, it is referred to the above discussion of the cable bending limiting arrangement.

Figure 2:
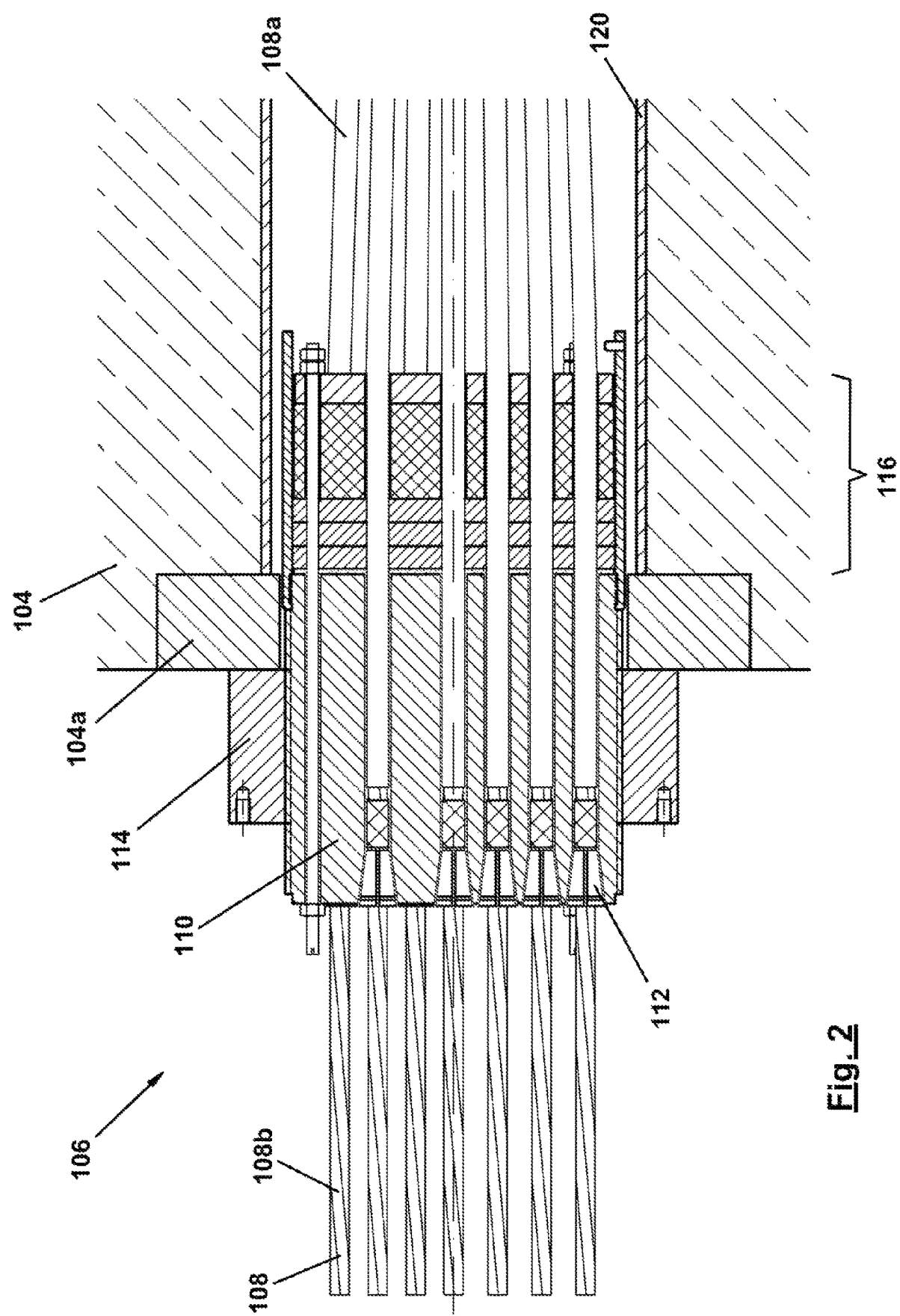
Figure 3:
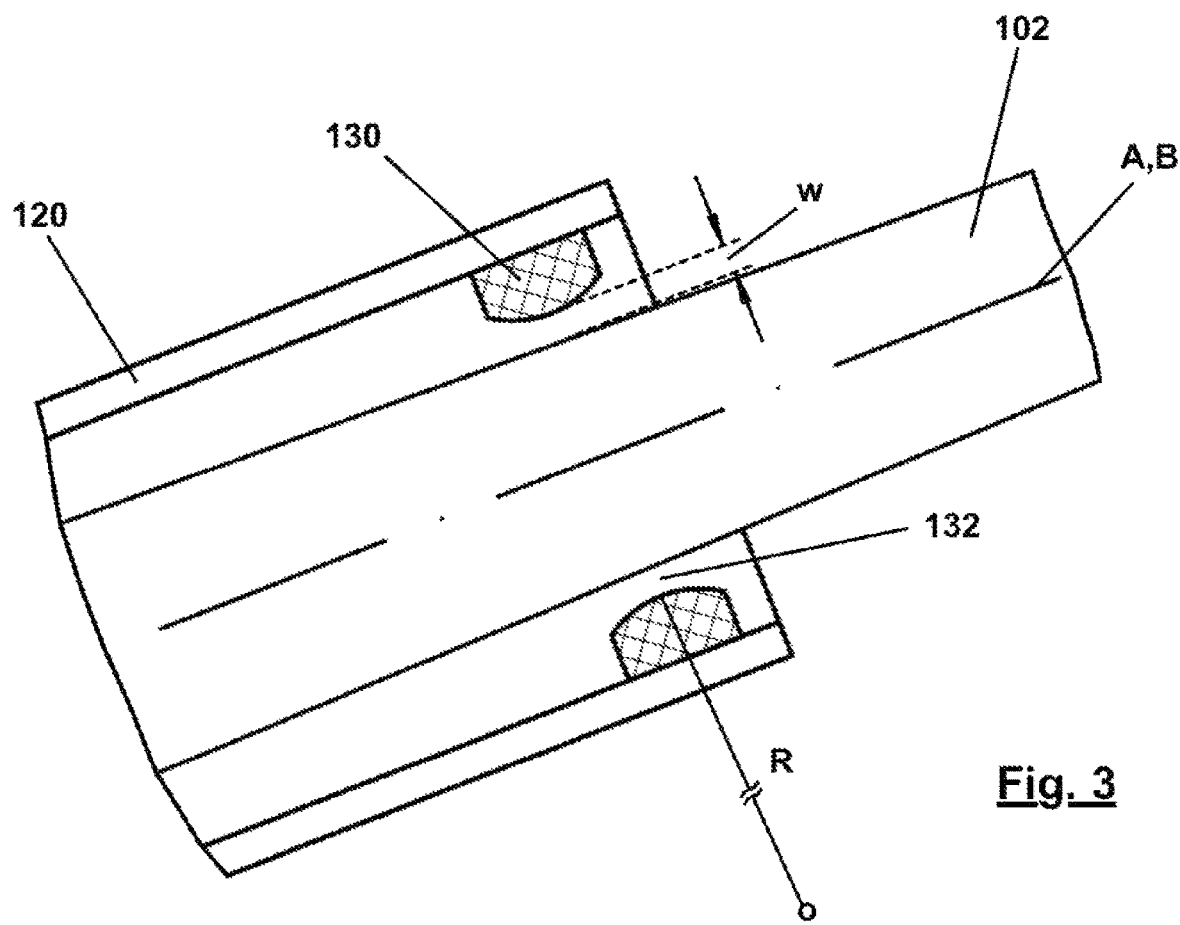
Figure 4:
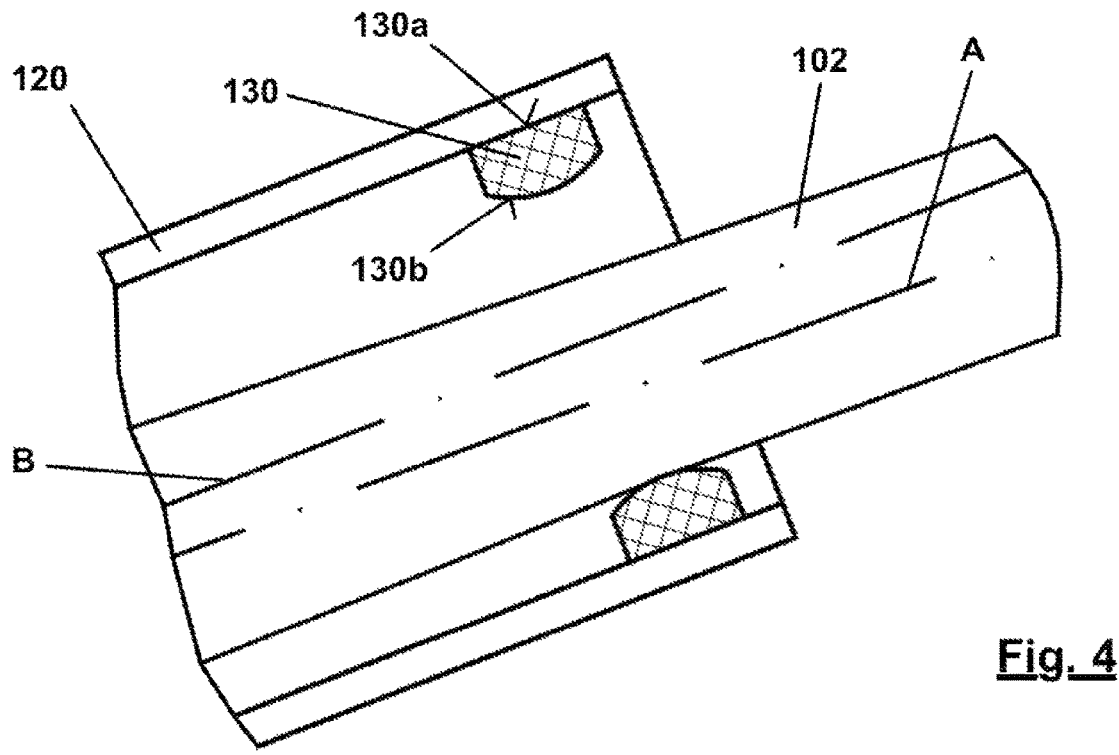

In the following, the present invention will be explained in more detail referring to the attached drawing, in which FIG. 1 shows a schematic sectional side view of a cable bending limiting arrangement according to the present invention in cooperation with a cable and other components of an anchoring arrangement;

FIG. 2 shows an enlarged sectional view of the anchoring section of the anchoring arrangement; and FIGS. 3 and 4 show enlarged sectional views of the cable bending limiting arrangement according to the present invention in a neutral state (FIG. 3) and in a state, in which it becomes active by being in contact with both, the cable and the recess pipe (FIG. 4).

In FIG. 1 an anchoring arrangement is generally designated by reference to numeral 100. In the embodiment shown in FIG. 1, the anchoring arrangement 100 serves for anchoring a stay cable 102 of a cable stayed bridge to a merely schematically indicated bridge deck 104 of the cable stayed bridge via an anchorage 106 abutting against an anchor plate 104a of the bridge deck 104.

The stay cable 102 comprises a plurality of strands 108 which, as may be seen in more detail from FIG. 2, are individually fixed to an anchor block 110 of the anchorage 106 by means of conical wedges 112. A ring nut 114 is screwed onto the anchor block 110 and is pressed against the anchor plate 104a by the tension of the stay cable 102. Furthermore, a watertight and adjustable sealing unit 116 is provided which interacts with the sheathing 108a surrounding the wires 108b of the strands 108 up to the wedges 112. With respect to the constructional and functional details of the anchorage 106 reference is made to US 2016/0168855 A1 filed by the present applicant and relating to such an anchorage. The disclosure of US 2016/0168855 A1 relating to the design of the anchorage is hereby incorporated in to the present application by way of reference.

Referring back to FIG. 1, the strands 108 of the stay cable 102 are bundled together by a compacting clamp unit 118 in order provide a minimum cross-section to environmental forces, such as wind and rain induced forces. Seen from another perspective, the strands widen from the compacting clamp unit 118 towards the anchorage 106 in order to allow their individual fixation to the anchor block 110. The compacting clamp unit 118 is located at a predetermined distance d from the anchor block 110 in order not to exert too much bending stress onto the strands 108. Of course, the bending stress focusses at the anchor block 110, and in particular at the location of the conical wedges 112, while at least some bending stress is relieved by the design of the sealing unit 116.

In order to protect the stay cable 102 from external influences, it is surrounded by a recess pipe 120 and a transition pipe 122. While the recess pipe 120 is embedded in the concrete of the bridge deck 104 close to the anchor plate 104a (see FIG. 2), and thus is rigidly connected to the bridge deck 104, the transition pipe 122 is releasably connected to the recess pipe 120. In order to allow attaching the compaction clamp unit 118 to the stay cable 102, the recess pipe 120 has a length l1 which is smaller than the predetermined distance d, while the transition pipe 122 has a length l2 which in combination with the length of the recess pipe 120 allows to cover the compaction clamp unit 118.

As already mentioned at the outset, the stay cables 102 are subject to movements, in particular lateral movements, namely dynamic movements, e.g. induced by wind and rain, vibrations of the bridge deck due to heavy traffic, earth quakes and the like, and quasi-stationary movements, e.g. induced by temperature, a traffic jam on the bridge, the exchange of a neighboring stay cable and the like. As a consequence of such lateral movements, dynamic bending stress of the strands 108 of the stay cables 102 occurs near the anchorage 106, and in particular close to the conical wedges 112.

For reducing the amplitude of such lateral movements, i.e. the bending angle of the strands 108, and thus the bending stress exerted on the cables 102, a damping device 124 is laterally attached to the stay cable 102. One end of the damping device 124 is connected to the compacting clamp unit 118 while the respective other ends thereof is connected to the bridge deck 104. The damping device 124 may, for example, include a hydraulic damper.

As a further measure for reducing the bending stress exerted on the strands 108, a cable bending limiting device 130 is provided inside the recess pipe 120, advantageously adjacent to the free end 120a thereof.

According to the embodiment shown in FIGS. 1, 3 and 4, the cable bending limiting device 130 may be formed by a ring element having an outer diameter substantially equal to the inner diameter of the recess pipe 120. Advantageously, the ring element 130 has a cylindrical surface 130a on its radially outer side and a curved surface 130b of a predetermined maximum curvature at its radially inner side. In particular, the surface of predetermined maximum curvature, i.e. predetermined minimum radius, allows to further limit the bending stress exerted on the strands. Advantageously, the radius R (see FIG. 3) of the predetermined curvature may amount to at least 2 m, preferably to at least 3.5 m, even more preferably to at least 4.3 m.

As may be seen from FIG. 3, an annular gap 132 having a radial width w exists between the cable bending limiting device 130 and the strands 108 of the stay cable 102, if the central axis A of the stay cable 102 is in alignment with the central axis B of the anchorage 106. However, the central axis A of the stay cable 102 may be deflected from this aligned state due to environmental forces. Due to the spacing between the cable bending limiting device 130 and the strands 108 of the stay cable 102, the stay cable 102 may freely move in the lateral direction, as long as its bending angle doesn't exceed a predetermined threshold angle. In this context, the term "freely" refers to the fact that there is no contact between the cable bending limiting device 130 and the strands 108 of the stay cable 102, while taking the action of the damping device 124 into account.

As soon as the stay cable 102 abuts against the cable bending limiting device 130 (see FIG. 4), the bending of the strands 108 at the anchorage 106 is stopped, and a second bending location is created at the contact point/area with the cable bending limiting device 130 resulting in a local distribution of the bending stress. Furthermore, the radius R of the curved surface 130b makes sure that the bending stress exerted on the strands 108 by the cable bending limiting device 130 doesn't exceed their respective design limit.

As a consequence, the cable bending limiting device 130 according to the present invention reliably prevents the stay cable 102 or its strands 108, respectively, from being subjected to excessive bending stress.

The invention claimed is:

1. A cable bending limiting arrangement for an anchoring unit comprising an anchorage, a cable including a plurality of wires and/or strands extending in a tensioned manner from the anchorage, a compacting clamp unit adapted for compacting the wires and/or strands to a side-by-side arrangement and located at a predetermined distance from the anchorage, and a recess pipe surrounding the cable in at least a portion of the predetermined distance,
   the cable, the anchorage, the compacting clamp unit and the recess pipe not being part of said cable bending limiting arrangement,
   wherein said cable bending limiting arrangement comprises a cable bending limiting device adapted for being located axially inside the recess pipe and radially between an outer surface of the cable and an inner surface of the recess pipe leaving an annular gap of a predetermined radial width if the longitudinal axis of the cable extends substantially parallel to the longitudinal axis of the anchorage,
   wherein the cable bending limiting device has a substantially cylindrical surface on its radially outer side and a curved surface of a predetermined maximum curvature at its radially inner side and the cable bending limiting device being configured to be located in the recess pipe to allow the cable to abut against the cable bending limiting device when a central axis of the cable deflects from a state where the central axis of the cable is not in alignment with a central axis of the anchorage.

2. The cable bending limiting arrangement according to claim 1,
   wherein said predetermined radial width corresponds to a bending angle of not more than 40 mrad.

3. The cable bending limiting arrangement according to claim 1,
   wherein a radius of the predetermined curvature amounts to at least 4.3 m.

4. The cable bending limiting arrangement according to claim 1,
   wherein the cable bending limiting device is attached to the inner surface of the recess pipe.

5. The cable bending limiting arrangement according to claim 1, wherein the cable bending limiting device is located closer to a free end of the recess pipe than to an opposite end thereof.

6. The cable bending limiting arrangement according to claim 1, wherein the cable bending limiting device is made from polyethylene or a rubber material.

7. The cable bending limiting arrangement according to claim 1, wherein the material of the cable bending limiting device has an elasticity modulus of at least 700 MPa or a hardness of at least 60° Shore A, respectively.

8. The cable bending limiting arrangement according to claim 1, further comprising a damping device adapted for damping lateral movement of the cable and adapted for being laterally attached to the cable.

9. The cable bending limiting arrangement according to claim 8,
   wherein the damping device includes at least one of a fluidic damper, a friction damper and a rubber damper.

10. The cable bending limiting arrangement according to claim 8, wherein the damping device is adapted to have one end connected to the compacting clamp unit.

11. A cable bending limiting arrangement in combination with an anchoring unit,
   the anchoring unit comprising
      an anchorage;
      a cable including a plurality of wires and/or strands extending in a tensioned manner from the anchorage;
      a compacting clamp unit adapted for compacting the wires and/or strands to a side-by-side arrangement and located at a predetermined distance from the anchorage; and
      a recess pipe surrounding the cable in at least a portion of the predetermined distance,
   the cable bending limiting arrangement comprising
      a cable bending limiting device adapted for being located axially inside the recess pipe and radially between an outer surface of the cable and an inner surface of the recess pipe leaving an annular gap of a predetermined radial width if the longitudinal axis of the cable extends substantially parallel to the longitudinal axis of the anchorage,
   wherein the cable bending limiting device has a substantially cylindrical surface on its radially outer side and a curved surface of a predetermined maximum curvature at its radially inner side and the cable being configured to abut against the cable bending limiting device when a central axis of the cable deflects from a state where the central axis of the cable is not in alignment with a central axis of the anchorage.

* * * * *